July 29, 1958 D. A. BATTISTE 2,845,356
PROCESS OF PREPARING AN IN-CAN BAKED
CANNED CAKE PRODUCT
Filed Sept. 14, 1956
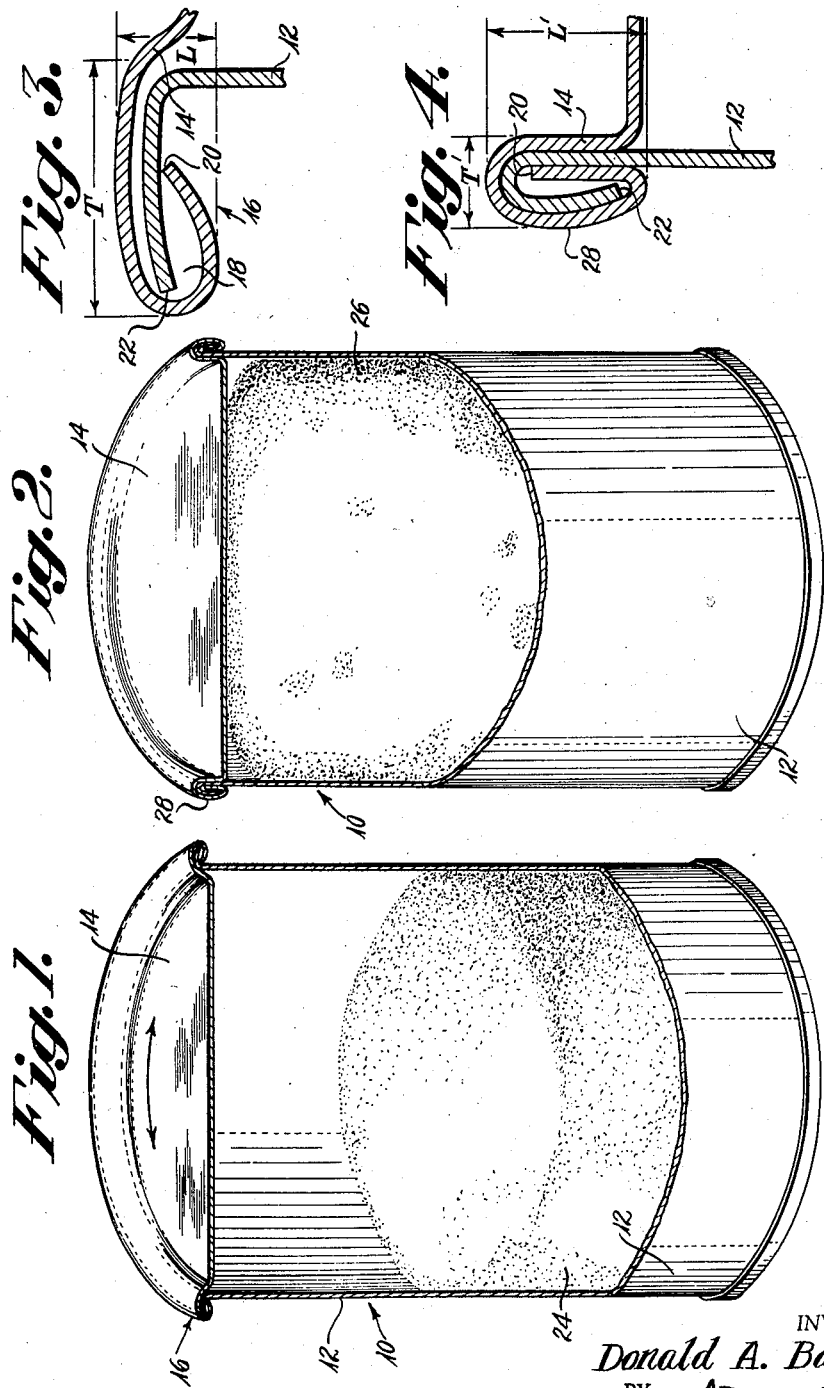
INVENTOR.
Donald A. Battiste
BY
ATTORNEY United States Patent Office 2,845,356
Patented July 29, 1958

2,845,356
PROCESS OF PREPARING AN IN-CAN BAKED CANNED CAKE PRODUCT

Donald A. Battiste, Philadelphia, Pa.

Application September 14, 1956, Serial No. 609,979

3 Claims. (Cl. 99—172)

This invention relates to process of preparing an in-can baked canned cake product and more particularly to golden pound cake, angel food cake, 100% whole wheat pound cake, corn bread, chocolate pound cake, chocolate brownies, chocolated brownies, marble pound cake and raisin pound cake.

Various attempts have been made to bake cake and special types of bread in a can and hermetically seal same to produce a canned baked bakery product, but each attempt has proved that it is very difficult to provide an in-can baked cake or special bakery product which will be stable and edible after a long period of time.

This application is a continuation-in-part of my co-pending application Serial No. 357,899, filed May 27, 1953, entitled "Canned Baked Products," now abandoned, and a division of my co-pending application Serial No. 454,767, filed September 8, 1954, entitled "Method of Preparing an In-Can Baked Rye Bread and the Resultant Product."

It is an object of this invention to provide by my novel in-can baking process bakery products which are baked in a can and which may be stored for long periods of time and subsequently consumed without any danger to the health of the user.

It has been discovered in accordance with my present invention that a stable in-can baked cake or specialty bakery product may be produced from the specific recipes, to be given hereinafter, which will provide the in-can baked cake or specialty bread to be hermetically sealed in a container which has a limited amount of moisture, of not more than 34%, and has a low pH value of 4.3 to 5.5, inclusive. The control of the moisture content and pH value in in-can baked cake and specialty bakery products eliminates the dangers of C. botulinum toxin by preventing the survival of any spores which may have formed in the can. Further, by keeping the pH value constant it is possible to prevent B. mesenterious growth.

Accordingly, it is the prime object of this invention to successfully produce commercially acceptable in-can baked cake and specialty bakery products, such as golden pound cake, angel food cake, 100% whole wheat pound cake, corn bread, chocolate pound cake, chocolate brownies, chocolated brownies, marble pound cake and raisin pound cake. In each of the above mentioned examples the result of cakes and specialty bakery products produced by following my novel in-can baking process has been a canned baked product of superior quality of a high degree of stability.

In the accompanying drawings:

Fig. 1 is an isometric view partly in section with parts thereof broken away showing the tightly clinched can having a portion of batter or piece of dough therein prior to the in-can baking step;

Fig. 2 is a view similar to Fig. 1 showing the in-can baked cake or special bakery product after the can has been completely sealed;

Fig. 3 is a sectional view showing the clinched double seam of the can in Fig. 1, on an enlarged scale for the purpose of illustration only, showing the obstructed opening intermediate the peripheral edge of the lid and the peripheral upper edge of the can body; and Fig. 4 is a view similar to Fig. 3 showing as an illustrative unchanged view the double seam of the sealed can of Fig. 2.

In producing the in-can baked canned cake and specialty bakery products of the instant invention, my process involves the preparation of special mixes, each to be specifically shown by way of example hereinafter. These specific mixes are treated individually with regard to the steps prior to the baking thereof, and I shall specifically disclose the preparation of each mix individually after I have explained certain steps in my novel process which is common for all of the products.

After each of the specific mixes are prepared they are scaled or divided into portions or pieces and loaded into cans or containers, and the lids or covers are partially sealed to the can or containers by tightly clinching the lins or covers thereon by a clinching machine. The partial clinching of lids on cans has a definite and well known meaning in the art. I have found that by tightly clinching the lids onto the cans, baking the contents within the can and immediately completely sealing the cans after baking that I can acquire a vacuum of from 26½ inches to 29½ inches of Hg in the can. Further, I have found that even with such high can vacuum the cans will not buckle or panel.

It is desirable to have a very high can vacuum in the sealed in-can baked cake or special bakery product since a high vacuum insures that the finished baked product will be more stable due to the minimized oxidation within the can with less opportunity for the rusting thereof.

Referring now to Fig. 1 of the drawing wherein there is shown a conventional can designated in its entirety at 10 comprising a body portion 12 and a lid or cover portion 14. The can lid or cover 14, as shown in Figs. 1 and 3, is partially sealed to the can body portion 12 by clinching the lid or cover 14 to the body portion 12. The double seam 16 formed by the tightly clinching step, (note Fig. 3) will measure from .154 inch to .169 inch in thickness and between .090 inch to .120 inch in length. In Fig. 3, the length of the clinched double seam 16 is designated L, and the thickness T. Thus the can lid 14 is partially sealed and tightly clinched to the can body 12 so that a pressure is required to be exerted thereagainst in order to rotate the lid 14 in the direction of the arrow with respect to the can body portion 12.

The partial seal created by tightly clinching the lid 14 on the can body 12 provides (note Fig. 3) a minute opening 18 intermediate the peripheral edge 20 of the lid 14 and the top peripheral edge 22 of the can body 12. The opening 18 is of particular configuration and provides for an obstructed opening which prevents air, gas or the like from entering the can, and further allows for the release of gases and a certain amount of vapor from the can during the baking of the contents therein. It should be stated that Fig. 3 is enlarged, for the purpose of illustration, and that the obstructed opening 18 shown therein is actually much smaller in comparison with the thickness of the lid 14 and the body 12 than as shown in the drawing. It is necessary to provide a partial seal or an obstructed opening in the cans in order to prevent the creation of high internal pressure and subsequent explosion of the can during the baking of the contents. However, such an opening can be too large or unobstructed, as for example a pin hole or a loose clinch, so that after the baking of the contents and before the opening is hermetically sealed air, gas or the like may enter the closed can through the unobstructed opening, since such an unobstructed opening allows for the entrance of air under normal pressure. Further, such an unobstructed opening will cause a low undesired vacuum when the can is sealed. I have found that a tight clinch within the limits of measurement stated above is essential to acquiring in-can baked canned cake and specialty bakery products which have the characteristics necessary in order for the product to be stable and retain its quality for at least a twelve month period.

The obstructed opening 18 prevents the entrance of air, vapor or the like into or out of the can unless the air is under a definite pressure. Obviously when the product is being baked the air and/or vapor trapped therein is heated and since the expansion thereof is limited the pressure is increased which affords it the necessary pressure to overcome the obstruction of the opening 18 thereby permitting the trapped air and/or vapor to escape from the can. However, the air which is normally outside of the can is not under any positive pressure and accordingly the obstruction of the opening 18 is such that it will prevent this air from entering the can, thus preventing the entrance of bacteria or the like into the product within the can. In effect the obstructed opening 18 acts as a type of valve which prevents movement of air under normal pressures.

Further, during the baking of the can or container in the oven, to be described in more detail hereinafter, the lid 14 becomes rigidly secured to the can body 12 by reason of the normal expansion of metals when heated so that upon removal of the can from the oven, the lid cannot be rotated with respect to the can body thus closing the opening 18. The lid is completely sealed by a sealing machine, to be described hereinafter, before the obstructed opening 18 has an opportunity to re-open. However, the opening 18 remains open during the baking period for a sufficient time to allow the air, vapor and the like and the gases omitted from the dough to escape. This controlled escape of the gases from the dough gives the finished baked cake and special bakery product the desirable characteristics for consumer appeal. Further, the temporary closing of the obstructed opening 18 assures that no air, vapor, gas or the like may enter the can before the can is permanently sealed.

By providing my tightly clinched lid 14 and can body 12 with an obstructed opening 18 I am able to obtain a certain amount of moisture within the can which will condense on the cooling of the can and be absorbed by the baked cake or specialty bakery product contained therein, and this absorption coupled with the high can vacuum causes the baked product to retain its oven fresh condition for a long period of time.

The partially sealed tightly clinched cans 10, shown in Fig. 1, containing the portions of batter or pieces of dough 24 are then positioned on wire basket trays and placed in an oven and baked until the canned cake or specialty bakery products are done.

It should be stated that it is desired to have a uniform top and bottom heat in the oven and that each individual can should be spaced from the next adjacent can in order to provide a uniform heat thereto. It should also be stated that it is necessary to coat the can 10 with a special heat grease-resisting enamel which will not cause an off-flavor to the baked cake or specialty bakery products. Further, it was found that the conventional bright shiny can reflected considerable heat, and in place thereof I have used a can having a specially prepared outer gold covering which provides substantially the same amount of heat absorption as a darker can and has the added advantage of greater consumer sales appeal.

The in-can baked canned cake and specialty bakery products are removed from the oven and immediately completely sealed by a sealing machine. The results of actual time motion studies show that when the tray of cans 10 is removed from the oven the first can off the tray is completely sealed within 7 to 12 seconds, and the last can removed from the same tray is completely sealed within 43 to 48 seconds from the time the tray is removed from the oven.

Attention is now directed to Fig. 2 wherein there is shown a can of in-can baked cake or specialty bakery product 26 after the can has been completely hermetically sealed. It should be noted that the clinched double seam 16 has now been formed into a complete double seam 28 by the sealing machine. As shown in Fig. 4 the thickness of the double seam 28 is designated by T' and the length by L'. It is readily seen that when the can 18 is completely sealed by the double seam 28 the obstructed opening 18 is completely closed.

Thereafter, the can 10 containing the in-can baked canned cake and specialty bakery products is placed on racks and cooled either by a blast of cool air or by a water spray, so that the canned baked product will have a specific temperature of between 80° to 90° F. in the can within a period of time less than 60 minutes.

Broadly, the process for producing an in-can baked canned cake product according to my present invention comprises the preparation of a cake mix which is loaded into the cans. Preferably the amount of mixture is utilized so that upon rising and baking the finished cake will completely fill the can. A paper lining is inserted into each can before the portion of the cake mixture is loaded therein to prevent the adherence of the mix to the can. This paper lining replaces the greasing step of the specialty bakery dough process since cake mixes are not greased prior to the loading thereof into the cans. The can covers are then tightly clinched, as stated above, and the loaded cans are baked for a period sufficient to finish the cake, immediately removed from the oven and completely sealed, as stated above. Thereafter the sealed cans containing the baked cake are subjected to an air or water spray to quickly cool them to the desired temperature.

In both the in-can baked cake product and the in-can baked canned specialty bakery product, the preparation of batters and doughs only sufficient amounts of ingredients are added so that the finished in-can baked cake or specialty bakery product has not more than 34% moisture and a pH value of 4.3 to 5.5, inclusive.

The following examples serve to illustrate but are not intended to limit the present invention. In each of the following examples the portions of the various mixes are measured for placement in a #2½ or 401 x 411 can which measures 4⅟₁₆ inches in diameter and 4¹¹⁄₁₆ inches in height, and the scaling of portions which are measured by weight are adapted to be placed in this type of can and baked therein in an oven. In effect the #2½ can becomes the baking pan for the following examples:

*Golden pound cake*

Mix at high speed for 3 minutes, 20 lbs. of flour and 10 lbs. of shortening; after the 3 minute mixing period add 21 lbs. of sugar, 6 oz. of salt, 4 oz. of baking powder, 1½ lbs. of high acid milk powder and 10 lbs. of water. These ingredients are then mixed at high speed for 6 minutes until smooth. To this mixture is added 10 lbs. of frozen whole eggs, 3 oz. of vanilla flavor and ½ oz. of lemon flavor. These ingredients are then mixed at slow speed for 5 minutes, and at the end of the mixing time the batter is measured or scaled to 12¼ oz. portions and placed in a #2½ can. The can has a paper liner so that the batter will not adhere to the can during baking. A top is tightly clinched to the can and the can is then placed in an oven and baked at a temperature of 330° F. for approximately 1 hr. If a higher temperature than 330° F. is used the cake will crake on top. After baking the can is immediately completely sealed and cooled so that the temperature of the baked cake inside the can is between 80° and 90° F.

The above stated formula for golden pound cake may be used in the preparation of an in-can baked canned salt-free pound cake by only eliminating the salt from the mix.

In using the specific mixes disclosed above for both the golden pound and salt free pound cake the resulting products will each have a moisture content of not more than 34% and a pH value of 5.0 to 5.2.

Angel food cake

At high speed, mix and whip 10 lbs. of egg whites with 2½ oz. of salt until the eggs are whipped into a foam; sift together 5 lbs. cane sugar and 2½ oz. of cream of tartar, and gradually add these sifted ingredients to the whipped egg whites while mixing. When the eggs and sugar are whipped to a peak add 5 lbs. cane sugar and 3 lbs. 12 oz. of flour, mixing at low speed. Scale or weigh 6¼ oz. portions of this batter for each #2½ can. Tightly clinch a lid to the can and bake in an oven at 330° F. for approximately 35 minutes. After baking, remove the cans from the oven and set aside before sealing the can, since an angel food cake is so light in weight it is necessary to allow about 10 minutes before the lid is completely sealed on the can. The light weight of the angel food cake will not permit a high vacuum in the can. After complete sealing of the cans they are cooled in the regular way, as stated above, until the in-can baked angel food cake has a temperature of approximately 80° to 90° F.

A salt free angel food cake may be baked in the same manner with the same formula by only eliminating the 2½ oz. of salt from the above.

In using the specific mixes disclosed above for both the angel food cake and salt free angel food cake the resulting products will each have a moisture content of not more than 34% and a pH value of 4.3 to 4.5.

100% whole wheat pound cake 20 lbs. of whole wheat flour and 10 lbs. of shortening are mixed at high speed for 3 minutes. After the high speed mixing time there is added 20 lbs. of brown sugar, 1½ lbs. of high acid milk powder, 6 oz. of salt, 10 lbs. of water, 1½ oz. of vanilla, 4 oz. of baking powder. These ingredients are mixed at high speed for 6 minutes until smooth, and then 10 lbs. of frozen whole eggs are added and mixed with the above ingredients at low speed for another 5 minutes. The final mixture is weighed or scaled to 14¼ oz. portions and placed in a #2½ can having a paper liner therein. The can has a lid which is tightly clinched thereto and baked in an oven at 330° F. for approximately 1 hr. After baking the can is immediately completely sealed and then cooled according to the regular procedure stated above.

A 100% whole wheat pound cake which is salt free may be produced in accordance with my invention by only eliminating the 6 oz. of salt from the above formula.

In using the specific mixes disclosed above for both the 100% whole wheat pound cake and 100% whole wheat salt free pound cake the resulting products will each have a moisture content of not more than 34% and a pH value of 5.3 to 5.5.

Corn bread

Blend 9 lbs. of sugar, 6 lbs. of shortening, 4½ oz. of salt, 3 oz. of vanilla, and 12 oz. of high acid milk powder. Cream these ingredients to a mass for approximately 5 minutes and then add 6 lbs. of whole eggs with 9 lbs. of water, 9 lbs. of corn meal, 12 oz. of baking powder, 13½ lbs. of flour and mix. The batter is then scaled or weighed in 16¼ oz. pieces and placed in #2½ cans, a lid being tightly clinched on each can, as stated above, and the cans placed in an oven and baked at 400° F. for approximately 1 hr. After baking the cans are removed from the oven and immediately completely sealed and cooled in accordance with the procedure above stated. The resulting corn bread product, as produced in accordance with the procedure stated above, will have a moisture content of not more than 34% and a pH value of 5.3 to 5.5.

Chocolate pound cake batter mix #2

A dough is prepared from 36 lbs. of cake flour, 4 lbs. of bread flour, 20 lbs. of shortening, 3 lbs. of milk, 42 lbs. of sugar, 1 lb. of salt, 12 ozs. of baking powder, 2 to 8 lbs. of water, 15 lbs. of cocoa, 20 lbs. of whole eggs, 8 ozs. of vanilla and 8 ozs. of chocolate flavor.

The cake flour, bread flour and shortening are creamed together for three minutes at high speed. The sugar, milk, salt and baking powder are blended together, then the water and cocoa are added and mixed for six minutes at a medium speed. The eggs, vanilla and chocolate flavor are added and mixed at a slow speed for five minutes. The mixture is deposited into cans, lids tightly clinched and baked approximately one hour at a temperature of 330° to 350° F. The resulting chocolate pound cake batter mix #2 product, as produced in accordance with this specific method, will have a moisture content of not more than 34% and a pH value of 5.0 to 5.5.

Marble pound cake

A batter is prepared from 36 lbs. of cake flour, 4 lbs. of bread flour, 20 lbs. of shortening, 42 lbs. of granulated sugar, 12 ozs. of salt, 8 ozs. of baking powder, 3 lbs. of milk powder, 21 lbs. of water, 20 lbs. of whole eggs, 6 ozs. of vanilla, 1 oz. of lemon and 16 ozs. of chocolate mix #2.

These ingredients are formulated as in the preparation of the chocolate pound cake, above, except that the chocolate is streaked through the golden batter to give a marble effect. The resulting marble pound cake product, as produced in accordance with this specific method, will have a moisture content of not more than 34% and a pH value of 5.3 to 5.5.

Raisin pound cake

A batter is prepared from 18 lbs. of cake flour, 2 lbs. of bread flour, 10 lbs. of shortening, 21 lbs. of cane sugar, 6 ozs. of salt, 5 ozs. of baking powder, 1½ lbs. of milk, 10½ lbs. of water, 10 lbs. of whole eggs, 1½ ozs. of lemon, 2 ozs. of butter flavor, 2 ozs. of cranberry and 4 lbs. of raisins.

These ingredients are mixed and baked as in the preparation of the chocolate pound cake, above. The resulting raisin pound cake product, as produced in accordance with this specific method, will have a moisture content of not more than 34% and a pH value of 5.3 to 5.5.

Chocolate brownies #1 plain

A batter is prepared from 6 lbs. of granulated sugar, 1 oz. of salt, 10 ozs. of brown sugar, 2 lbs. of corn syrup, 1–12 ozs. of shortening or margarine, 2 lbs. of whole eggs, 3 lbs. of melted block chocolate, 1 lb. of water, 2½ lbs. of cake flour, 2½ lbs. of bread flour, 4 lbs. of fine mixed nuts or pecans, ½ oz. of chocolate and ½ oz. of vanilla.

The flour and shortening are creamed together for approximately three minutes. Then the sugar, syrup and salt are creamed for another three minutes. Then the melted blocks of chocolate are added to the mix and creamed for an additional two minutes and the water, chocolate flavor and vanilla are added with the mixed nuts and the mixing is continued for another three minutes. The mix is scaled and placed in the cans and the lids are tightly clinched thereon. The loaded cans are baked for approximately 45 minutes to one hour at a temperature of approximately 340° F. The resulting chocolate brownies, as produced in accordance with this specific method, will have a moisture content of not more than 34% and a pH value of 5.3 to 5.5.

Chocolated brownies

The same formula for chocolate brownies #1 plain is used for chocolated brownies and the same mixing procedure is followed except that a melted chocolate, approximately 1 oz. is put into the bottom of the can, and the batter is added to it. The tightly clinched loaded can is then baked for approximately 45 minutes to one hour at a temperature of approximately 340° F. The resulting chocolated brownies, are produced in accordance with this specific method, will have a moisture content of not more than 34% and a pH value of 5.3 to 5.5.

The in-can baked cake and the in-can baked specialty bakery products produced in accordance with my novel process outlined above and respectively using the specific formulas stated above provides for a final canned in-can baked canned cake or in-can baked canned specialty bakery product having the properties required which satisfy the standards of the baking industry. It has been desired and there has long been a need for such in-can baked canned cake and in-can baked canned specialty bakery products.

I claim:

1. The process of preparing cake comprising preparing a batter having sufficient water to provide a moisture content of not more than 34% by weight in the cake after baking and other ingredients which provide a pH value of 4.3 to 5.5 in the cake after baking, loading a container with said batter, partially sealing the loaded container by clinching a cover thereto to provide an obstructed opening intermediate the peripheral edge of the cover and the container, baking said batter in said container at a temperature of approximately 330° to 340° F., completely sealing the container immediately after the baking of the batter in the container to close the obstructed opening and thereafter quickly cooling the sealed container to create a vacuum of at least 26½ in. of Hg therein.

2. The process of preparing a cake product comprising preparing a batter from ingredients to provide the cake product, after baking, with a moisture content of not more than 34% by weight and a pH value of 4.3 to 5.5, loading a container with said batter, partially sealing said container by clinching a cover thereto, baking said batter in said partially sealed container at a temperature of approximately 330° to 340° F., completely sealing said container immediately after the baking of the batter and thereafter quickly cooling the sealed container to create a vacuum of at least 26½ in. of Hg therein.

3. The process of preparing an in-can baked canned cake product comprising preparing a batter having sufficient water to provide a moisture content of not more than 34% by weight in the cake product after baking and other ingredients which provide a pH value of 4.3 to 5.5 in the cake product after baking, loading a container with said special batter, partially sealing the loaded container by clinching a cover thereto, baking said batter in said partially sealed container, completing the seal of the cover to the container immediately after the baking of the batter and thereafter quickly cooling the sealed container to create a vacuum of at least 26½ in. of Hg therein.

References Cited in the file of this patent

UNITED STATES PATENTS 1,680,898     Matti                Aug. 14, 1928

OTHER REFERENCES

Military Specification, Pound Cake, Canned, MIL-P-3234, June 26, 1950, pp. 1-4.

"Everybody's Cookbook," by Lord, revised edition, Harcourt, Brace & Co., New York, pp. 46 and 119-130.

"QMC Canned Bread," Modern Packaging, October 1948, page 206.

Military Specification, Bread, Canned, MIL-B-1070A, Dec. 7, 1950, pp. 2 and 4.

Military Specification, Bread, Canned, MIL-B-1070B Oct. 7, 1953, pp. 2 and 4.

Military Specification, Pound Cake, Canned, MIL-P-3234A, Sept. 22, 1952, pp. 1-5.

"In-Can Baking Perfected," by D. N. League, Food Engineering, May 1953, pp. 86, 87 and 151-153.